United States Patent
Zhu et al.

(10) Patent No.: US 10,798,204 B2
(45) Date of Patent: Oct. 6, 2020

(54) FILE BASED OR SINGLE MESSAGE BASED BULK OPERATION PROCESSING METHOD AND DEVICE

(71) Applicant: Alcatel Lucent, Nozay (FR)

(72) Inventors: Jie Zhu, Shanghai (CN); Wei Wei, Shanghai (CN)

(73) Assignee: Alcatel Lucent, Nozay (FR)

( * ) Notice: Subject to any disclaimer, the term of this patent is extended or adjusted under 35 U.S.C. 154(b) by 68 days.

(21) Appl. No.: 16/318,225

(22) PCT Filed: Jul. 12, 2017

(86) PCT No.: PCT/IB2017/001064
§ 371 (c)(1),
(2) Date: Jan. 16, 2019

(87) PCT Pub. No.: WO2018/015812
PCT Pub. Date: Jan. 25, 2018

(65) Prior Publication Data
US 2019/0166218 A1    May 30, 2019

(30) Foreign Application Priority Data

Jul. 19, 2016  (CN) .......................... 2016 1 0570067

(51) Int. Cl.
H04L 29/08    (2006.01)
(52) U.S. Cl.
CPC ...... *H04L 67/2833* (2013.01); *H04L 67/2823* (2013.01); *H04L 67/34* (2013.01)
(58) Field of Classification Search
CPC .. H04L 67/2833; H04L 67/2823; H04L 67/34
See application file for complete search history.

(56) References Cited

U.S. PATENT DOCUMENTS

| | | | |
|---|---|---|---|
| 6,571,285 B1 * | 5/2003 | Groath | ................ H04L 41/0631 370/352 |
| 7,756,953 B2 | 7/2010 | Pulpatta et al. | |

(Continued)

FOREIGN PATENT DOCUMENTS

| | | |
|---|---|---|
| CN | 101562516 A | 10/2009 |
| CN | 103001887 A | 3/2013 |

(Continued)

OTHER PUBLICATIONS

Chinese Office Action dated May 11, 2020 issued in corresponding Chinese Application No. 201610570067.8.

(Continued)

*Primary Examiner* — Michael Won
(74) *Attorney, Agent, or Firm* — Harness, Dickey & Pierce, P.L.C.

(57) ABSTRACT

A file based or single message based bulk operation processing method is provided, the method including constructing a configuration file including at least header information and a content part, the header information including at least a section index, the section index including at least length information of each command to be sent, the content part including a plain file formed by organizing corresponding commands to be sent in an order of the section index; sending, to a receiving terminal, bulk requests including information related to the configuration file; receiving a response from the receiving terminal; and transmitting the configuration file based on the response from the receiving terminal.

11 Claims, 1 Drawing Sheet

(56) References Cited

U.S. PATENT DOCUMENTS

| | | | |
|---|---|---|---|
| 8,099,758 B2* | 1/2012 | Schaefer | H04L 63/0428 |
| | | | 726/1 |
| 10,574,699 B1* | 2/2020 | Baer | H04L 63/123 |
| 2002/0147855 A1 | 10/2002 | Lu | |
| 2006/0184718 A1* | 8/2006 | Sinclair | G06F 12/0246 |
| | | | 711/103 |
| 2008/0010358 A1* | 1/2008 | Jin | H04L 41/0803 |
| | | | 709/207 |
| 2008/0189446 A1 | 8/2008 | Pulpatta et al. | |
| 2015/0237502 A1 | 8/2015 | Schmidt et al. | |
| 2017/0005865 A1* | 1/2017 | Liu | H04L 41/5054 |
| 2019/0166218 A1* | 5/2019 | Zhu | H04L 67/2833 |

FOREIGN PATENT DOCUMENTS

| | | |
|---|---|---|
| CN | 103023702 A | 4/2013 |
| CN | 103428771 A | 12/2013 |
| CN | 103997495 A | 8/2014 |
| CN | 104486371 A | 4/2015 |
| CN | 104579722 A | 4/2015 |
| CN | 104734876 A | 6/2015 |

OTHER PUBLICATIONS

International Search Report PCT/ISA/210 for PCT International Application PCT/IB2017/001064 dated Nov. 16, 2017.
Office Action for corresponding Chinese Application No. 201610570067.8 dated Jan. 20, 2020.
Office Action for corresponding Chinese Application No. 201610570067.8 dated Jun. 26, 2019.

* cited by examiner

FILE BASED OR SINGLE MESSAGE BASED BULK OPERATION PROCESSING METHOD AND DEVICE

CROSS-REFERENCE TO RELATED APPLICATIONS

This application is a national phase under 35 U.S.C. § 371 of PCT International Application No. PCT/IB2017/001064 which has an international filing date of Jul. 12, 2017, which claims priority to Chinese Application No. 201610570067.8, filed Jul. 19, 2016, the entire contents of each of which are hereby incorporated by reference.

FIELD

The present invention relates to communication field, in particular, to a file based or single message based bulk operation processing method and device.

BACKGROUND

Currently, switch and controller has some kind of message handling logic for openflow based Software Defined Network (SDN). But they are not intended to solve the bulk data transmission or traffic overhead problem.

Below is the summary for existed behaviors for message handling in current specification (1.5.1, last update at Mar. 26, 2015).

1. Single Atomic Message

This is the basic work mode for switch and controller. Each message contains only one request or reply. It is easy and straightforward, so repeated description shall not be made here.

2. Multipart Message

As sometimes, the single message cannot hold the larger packet, in general which is larger than 64 KB, the message are divided into small pieces. Multipart message is used to deliver each tiny part a time and extra flag to indicate which tiny part is the last message before finishing sending or receiving larger packet. Such kind of divide and conquer method identifies this scenarios and solves the problem with that extra flag to divide and assemble multiple messages.

3. Barrier Message

It is specially to make sure the requests are implemented by order. All requests before barrier request should be done before sending barrier response. In general, it is used to clean up all existed requests on switch. Then the new request starts after sending barrier reply.

4. Bundle Message

It is used to execute multiple requests as a transaction, all requests succeeded or nothing would be executed. It is used to bundle a group of requests as a single action.

5. Others

Based on research on the internet, it has some suggestions or patents to compress packet in package or special code/decode method for exchanged message.

According to above summary based on current specification and research, it does not have specific request type or logic to handle bulk requests and response messages in a short time.

SUMMARY

In view of the above problems, the invention provides a file based or single message based bulk operation processing method and device, so as to achieve processing of bulk requests and response messages in a short time.

According to one aspect of the invention, there is provide a file based or single message based bulk operation processing method, the method comprising the steps of:

constructing a configuration file including at least header information and a content part, the header information including at least a section index, the section index including at least length information of each command to be sent, the content part including a plain file formed by organizing corresponding commands to be sent in an order of the section index;

sending, to a receiving terminal, bulk requests including information related to the configuration file (e.g., file name, format, length and etc.);

receiving a response from the receiving terminal; and transmitting the configuration file based on the response from the receiving terminal.

According to another aspect of the invention, there is provided a file based or single message based bulk operation processing device, comprising:

a configuring means arranged to construct a configuration file including at least header information and a content part, the header information including at least a section index, the section index including at least length information of each command to be sent, the content part including a plain file formed by organizing corresponding commands to be sent in an order of the section index;

a transmitting means arranged to send, to a receiving terminal, bulk requests including information related to the configuration file;

a receiving means arranged to receive a response from the receiving terminal; and the transmitting means is further arranged to transmit the configuration file based on the response from the receiving terminal.

Thus, the invention sets forth a mode of sending bulk requests or responses out on open flow based SDN network. One single message or a single file, with bulk requests or responses, can mitigate network traffic overhead and improve interaction efficiency, specially for a large amount of configuration requests or query responses, or tiny interacted messages, such as switch configure, Asynchronized Event configure etc.

DRAWINGS

By reading the following detailed description of illustrative embodiments of the invention in combination with drawings, the aforesaid and other features and advantages of the invention will become more obvious, wherein.

DETAILED DESCRIPTION

Embodiments of the invention will be described in detail with reference to drawings. Features, advantages, or similar languages involved in the description do not imply that all the features and advantages achieved with the invention shall be covered by one embodiment of the invention. On the contrary, languages involving features and advantages should be understood in the way that specific features, advantages and characteristics in relation to the description of embodiments are contained in at least one embodiment of the invention. Furthermore, features, advantages and characteristics described in the invention can be merged into one or more embodiments in any appropriate manner. Those skilled in related art may understand that the invention can be implemented without one or more specific features or advantages of a particular embodiment. In other cases, additional features and advantages may appear in a particular embodiment that is not covered by all embodiments of the invention.

Why does bulk request/response message handling matter for the SDN network? Explanation will be given below in conjunction with a specific scenario.

1. Initial Phase Between Switch and Controller

When switch and controller establishes connections or synchronizes information first time or after role change (e.g., from Slave to Master), it has bunch of interactive message to learn each other, such as Hello Message, Switch Configuration, Flow Table, Group Table etc.

If this is the switch's first start-up, controller wants to apply bunch of default configurations, especially for the flow table, group table, meter table etc. Of course, such message can be delivered one by one. It also can be handled as below logic.

Controller constructs request message into a configuration file

The file format is flexible and negotiable between controller and client. For example, the file can be compressed, whether standard zip, gzip, 7zip or negotiated compression parameters. The file can be plain file also.

Controller sends file information to switch. The information at least includes file name, format, length, SHA digest etc.

When the negotiation is done, the file either can be transferred by established connection with message one by one, or a separate protocol (TFTP, FTP, SFP, SCP etc.)

When file is transferred to switch, switch begins to convert file (e.g., unzip the file), parse the file (with predefined schema) and handle each message in the file one by one.

Switch sends back any response, most of time it is error cases or any abnormal notifications, for each request message.

If request messages need send response, it is either sent separately with single message, with multipart message or other acceptable message.

After switch handles the whole bulk message, it sends final status to controller.

2. Controller Dumps Existed Configurations from Switch

If the controller does not have switch's data, it prefers to dump all data from switch first before making any change to avoid or mitigate side impact.

For this case, of course, it can query each entry one by one. Apparently, the efficiency is pretty low and the total network delay for all query and response messages impacts service recovery heavily. As the controller cannot proceed any necessary action before knowing that switch.

It is similar as above cases. But this time, the controller constructs bulk request and push it to switch. Switch prepares related data, construct file, negotiate parameters with controller, finally upload file to controller. Controller parses related data accordingly.

With above scenarios, one controller may manage hundreds of switch, such kind of file based bulk request or response handling does help solve or mitigate above issues.

Figure 1:
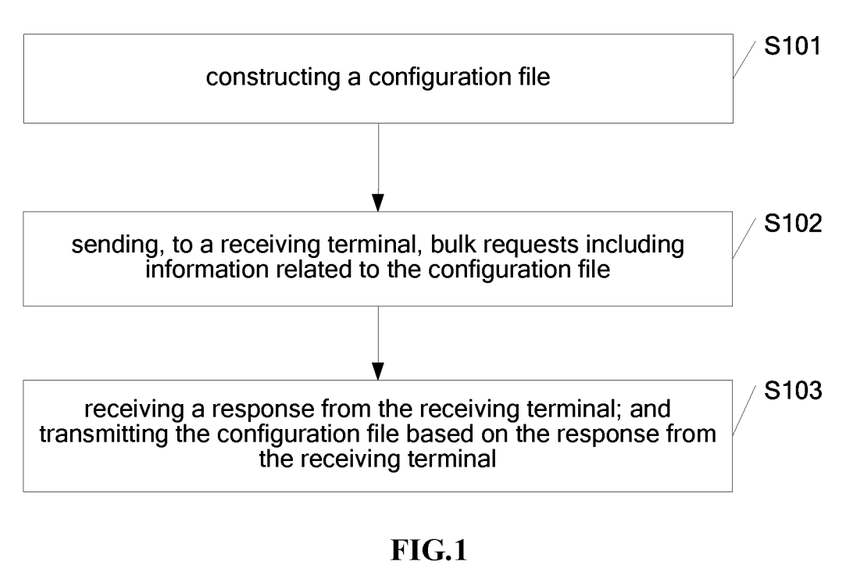
FIG. 1 shows a flowchart of one implementation according to a file based or single message based bulk operation processing method provided by the invention.

Based on the above scenarios, the invention provides a file based or single message based bulk operation processing method. As shown by FIG. 1, the method may comprise the following steps: in step S101, constructing a configuration file including at least header information and a content part, the header information including at least a section index, the section index including at least length information of each command to be sent, the content part including a plain file formed by organizing corresponding commands to be sent in an order of the section index; in step S102, sending, to a receiving terminal, bulk requests including information related to the configuration file; in step S103, receiving a response from the receiving terminal; and transmitting the configuration file based on the response from the receiving terminal, thereby enabling processing of bulk requests and response messages in a short time so as to mitigate network traffic overhead and improve interaction efficiency.

Wherein, information related to the configuration file may include file name, format, length and etc., and the method can be implemented by a controller or a switch.

According to one implementation, the configuration file further includes a field indicating whether the section index can hold length information of all commands, and the method further comprises: adding, if the section index cannot hold length information of all commands, a section index so as to hold length information of all commands.

According to one implementation, the bulk requests include a format of the configuration file to be sent, and the response includes a determination of whether the receiving terminal supports the format of the configuration file.

According to one implementation, if the receiving terminal supports the format of the configuration file, it may send to the transmitting terminal an ACCEPT message indicating that the format of the configuration file is acceptable. The ACCEPT message may include file digest information. Upon reception of the ACCEPT message, the transmitting terminal may transmit the configuration file to the receiving terminal in this format, and identify, by using the file digest information, the bulk requests being transmitted.

According to one implementation, in case the receiving terminal does not support the format of the configuration file, the response further includes a file format preferred by the receiving terminal, and the method further comprises: further negotiating with the receiving terminal about a format for transmitting the configuration file. Specifically, if the transmitting terminal supports the format preferred by the receiving terminal, it converts the format of the configuration file into the preferred format and transmits the converted configuration file to the receiving terminal; if the transmitting terminal does not support the format preferred by the receiving terminal, it sends a new file format to the receiving terminal for further negotiation with the receiving terminal.

According to one implementation, in case that an error occurs during transmission, the receiving terminal may send an error status message to the transmitting terminal to terminate the current transmission process, and optionally it may send, to the transmitting terminal, an error related to request for processing by the transmitting terminal; if no error occurs during transmission, the receiving terminal may send a DONE status message to the transmitting terminal when the transmission is completed.

The invention defines new OFPT_MULTIPART_BULK_REQUEST and OFPT_MULTIPART_BULK_REPLY and related data structures to carry content, and also defines controller behaviors and switch behaviors for OFPT_MULTIPART_BULK_REQUEST and OFPT_MULTIPART_BULK_REPLY.

A specific example is provided for illustration as follows:

An illustrative implementation program is provided below based on openflow 1.5.1 version (last update Mar. 26, 2015) of the SDN network.

Add the following OFPT_MULTIPART_BULK_REQUEST and OFPT_MULTIPART_BULK_REPLY actions and related structures:

```
enum ofp_type {
    /* Immutable messages. */
    OFPT_HELLO                      = 0,  /* Symmetric message */
    OFPT_ERROR                      = 1,  /* Symmetric message */
    OFPT_ECHO_REQUEST               = 2,  /* Symmetric message */
    OFPT_ECHO_REPLY                 = 3,  /* Symmetric message */
    OFPT_EXPERIMENTER               = 4,  /* Symmetric message */
    ......
    /* Bundle operations (multiple messages as a single operation). */
    OFPT_BUNDLE_CONTROL             = 33, /* Controller/switch message */
    OFPT_BUNDLE_ADD_MESSAGE         = 34, /* Controller/switch message */
    /* Controller Status async message. */
    OFPT_CONTROLLER_STATUS          = 35, /* Async message */
    OFPT_MULTIPART_BULK_REQUEST     = 36, /* Symmetric message */
    OFPT_MULTIPART_BULK_REPLY       = 37, /* Symmetric message */
};
#define MAX_BULK_COMMANDS 15
struct ofp_multipart_bulk_file_section_index {
    uint8_t index;                           /* Start from 0, content index for section */
    uint8_t has_more;                        /* 0 means no more index, else has more section appended */
    uint8_t length[MAX_BULK_COMMANDS];       /* Each command's length, appened on body part*/
    uint8_t pad[1];
    uint8_t body[0];                         /* Body of the request. 0 or more bytes. */
};
OFP_ASSERT(sizeof(struct ofp_multipart_one_request) == 4);
#define MAX_FILE_NAME_LENGTH 32
enum ofp_multipart_bulk_file_type {
    OFPMP_BULK_FILE_TYPE_PLAIN = 0,      /* Plain file */
    OFPMP_BULK_FILE_TYPE_ZIP = 1,        /* zip file. */
    OFPMP_BULK_FILE_TYPE_GZIP = 2,       /* gzip file. */
    OFPMP_BULK_FILE_TYPE_7ZIP = 3,       /* 7zip file. */
    OFPMP_BULK_FILE_TYPE_RAR = 4,        /* rar file. */
};
struct ofp_multipart_bulk_file_info_header {
uint16_t length;                             /* Length of this header */
uint8_t name[MAX_FILE_NAME_LENGTH]; /* File name */
uint16_t file_length;                        /* File length */
uint8_t sha_digest[20];                      /* File SHA digest */
uint8_t format;                              /* File format, one of OFPMP_BULK_FILE_TYPE_* */
    uint8_t pad[7];
    uint8_t body[0];                         /* Extra info of this header. 0 or more bytes. */
};
OFP_ASSERT(sizeof(struct ofp_multipart_bulk_file_info_header) == 64);
struct ofp_multipart_bulk_file_content_header {
uint8_t sha_digest[20];                      /* File SHA digest, to identify message and avoid heavy overhead */
    uint8_t body[4];                         /* Extra info of this header. 0 or more bytes. */
};
OFP_ASSERT(sizeof(struct ofp_multipart_bulk_file_content_header) == 24);
enum ofp_multipart_bulk_message_type {
    OFPMP_BULK_MESSAGE_TYPE_FILE_HEADER = 0,    /* File header */
    OFPMP_BULK_MESSAGE_TYPE_FILE_CONTENT = 1,   /* File content */
};
struct ofp_multipart_bulk_request {
    struct ofp_header header;
    uint8_t message_type;                    /* One of OFPMP_BULK_MESSAGE_TYPE_FILE_* */
uint8_t length;                              /* Length of this message header */
uint8_t has_more;                            /* 0 means no more content, else has more data appended */
    uint8_t pad[5];
/* depents on message type, the following content is either
```

```
ofp_multipart_bulk_file_info_header or
ofp_multipart_bulk_file_content_header */
    uint8_t body[0];                    /* Body of the response. 0 or
more bytes. */
};
OFP_ASSERT(sizeof(struct ofp_bulk_request) == 16);
enum ofp_multipart_bulk_reply_status {
    OFPMP_BULK_REPLY_STATUS_DONE = 0,           /* Success */
    OFPMP_BULK_REPLY_STATUS_ERROR = 1,          /* Failed */
    OFPMP_BULK_REPLY_STATUS_IN_PROGRESS = 2,    /* In progress */
    OFPMP_BULK_REPLY_STATUS_NEGOTIATION = 3,    /* Negotiation */
    OFPMP_BULK_REPLY_STATUS_ACCEPT = 4,         /* Accept */
};
struct ofp_multipart_bulk_reply {
    struct ofp_header header;
uint8_t status;   /* One of OFPMP_BULK_REPLY_STATUS_XXX */
uint8_t length;   /* Length of this reponse */
    uint8_t pad[6];
/* depents on status type, the following content is either
ofp_multipart_bulk_file_info_header or
ofp_multipart_bulk_file_content_header */
};
OFP_ASSERT(sizeof(struct ofp_bulk_request) == 16);
```

Next an example is used to define switch behaviors and controller behaviors for OFPT_MULTIPART_BULK_REQUEST and OFPT_MULTIPART_BULK_REPLY.

After setting connection with switch, controller wants to push default configurations to switch.

A) Controller Constructs Default Configurations as a Standalone File

The file should start with the structure of ofp_multipart_bulk_file_section_index defined above;

then appending the content of each configuration as normal single request after the section index;

at the same time, controller should update corresponding length information of each standalone command in section index area;

currently, section index has default limitation for the count of commands. If a single section index cannot hold all the commands, set has_more field as non-zero, then appends another section index to the file end. Then repeat above steps until all the commands are in the file.

By the way, the file can be constructed independently and it can be common for most of switches.

B) Controller Sends Bulk Request to Client

Fill ofp_multipart_bulk_request with OFPT_MULTIPART_BULK_REQUEST;

Set message_type as OFPMP_BULK_MESSAGE_TYPE_FILE_HEADER;

Fill ofp_multipart_bulk_file_info_header with file info and preferred format;

send out this request.

C) Switch Receives Bulk Request

Parse the request content;

extract file information;

if the file format is not supported, then interact with controller by OFPMP_BULK_REPLY_STATUS_NEGOTIATION status type. The response contains preferred file format. If the controller accepts the file format, then negotiation is done. Else controller sends bulk request again with new file format and repeat negotiation process. Currently, it supports file format negotiation only.

If switch accepts the file format, then send OFPMP_BULK_REPLY_STATUS_ACCEPT with file digest info. Controller uses the digest as key to identify on-going bulk request.

D) Controller Receives ACCEPT Message, Converts File to Proper Format and Starts to Send In future, it may support the option of file transmission method. Currently, the control channel is used to translate raw message;

coverts original file to negotiated file format, e.g., from plain file to zip file;

fill ofp_multipart_bulk_request with OFPT_MULTIPART_BULK_REQUEST;

set message_type as OFPMP_BULK_MESSAGE_TYPE_FILE_CONTENT;

fill ofp_multipart_bulk_file_content_header with file info;

append file content in the request;

send request out. It does not request explicit reply from switch;

repeat above steps until reaching file ending;

if there is any explicit response from switch, handle it with normal logic accordingly.

E) Switch Receives the Bulk Message digest is the key for each bulk request and response;

switch receives all the message, assemble them into a file;

covert file to plain file;

parse the file with the help of section index;

handle each normal request accordingly;

if any error occurs, it should send OFPMP_BULK_REPLY_STATUS_ERROR status to controller, then terminates current operation. It also can return request related to error to facilitate issue debugging;

If there is no error, send out OFPMP_BULK_REPLY_STATUS_DONE status to controller The bulk request and response session is done here.

OFPT_MULTIPART_BULK_REQUEST and OFPT_MULTIPART_BULK_REPLY can be expanded with more functions.

According to one implementation, the bulk requests are merged into one or more request messages and/or bulk responses are merged into one or more response messages.

According to one implementation, the request message and/or the response message is added if length of the merged request message and/or the merged response message exceeds a predefined length. The predefined length can be set as needed, such as 1500 bytes.

Why does one message with multiple requests/responses matter for the SDN network? Below are some explanations for this case based on one example.

PLY and related data structures to carry content, and also defines controller behaviors and switch behaviors for OFPT_MULTIPART_ONE_REQUEST and OFPT_MULTIPART_ONE_REPLY.

Below is a specific example.

An illustrative implementation program is provided below based on openflow 1.5.1 version (last update Mar. 26, 2015) of the SDN network.

Add the following OFPT_MULTIPART_ONE_REQUEST and OFPT_MULTIPART_ONE_REQUEST actions and related structures.

```
enum ofp_type {
    /* Immutable messages. */
    OFPT_HELLO                  = 0,  /* Symmetric message */
    OFPT_ERROR                  = 1,  /* Symmetric message */
    OFPT_ECHO_REQUEST           = 2,  /* Symmetric message */
    OFPT_ECHO_REPLY             = 3,  /* Symmetric message */
    OFPT_EXPERIMENTER           = 4,  /* Symmetric message */
    ......
    /* Bundle operations (multiple messages as a single operation). */
    OFPT_BUNDLE_CONTROL         = 33, /* Controller/switch message */
    OFPT_BUNDLE_ADD_MESSAGE     = 34, /* Controller/switch message */
    /* Controller Status async message. */
    OFPT_CONTROLLER_STATUS      = 35, /* Async message */
    OFPT_MULTIPART_ONE_REQUEST  = 36, /* Controller/switch message */
    OFPT_MULTIPART_ONE_REPLY    = 37, /* Controller/switch message */
};
#define MAX_REQUEST_COMMANDS 15
#define MAX_RESPONSE_COMMANDS 15
struct ofp_multipart_one_request {
    struct ofp_header header;
    uint8_t index;                              /* Start from 0, content index for section */
    uint8_t has_more;                           /* 0 means no more index, else has more section appended */
    uint8_t length[MAX_REQUEST_COMMANDS];       /* Each request's length, appened on body part*/
    uint8_t pad[3];
    uint8_t body[0];                            /* Body of the request. 0 or more bytes. */
};
OFP_ASSERT(sizeof(struct ofp_multipart_one_request) == 20);
enum ofp_multipart_reply_flags {
    OFPMPF_REPLY_MORE = 1 << 0 /* More replies to follow. */
};
struct ofp_multipart_one_reply {
    struct ofp_header header;
    uint8_t index;                              /* Start from 0, content index for section */
    uint8_t has_more;                           /* 0 means no more index, else has more section appended */
    uint8_t length[MAX_RESPONSE_COMMANDS];      /* Each response' s length, appened on body part*/
    uint8_t pad[3];
    uint8_t body[0];                            /* Body of the response. 0 or more bytes. */
};
OFP_ASSERT(sizeof(struct ofp_multipart_one_reply) == 20);
```

In respect of normal request and response size, according to current specification, the size of most requests/responses is less than 100 bytes. The normal MTU (Maximum Transmission Unit) of Ethernet based network is 1500 bytes. In general, less bytes cost less transmitting time. But considering the network path from source to destination, the delay on the path may be tremendously larger than the cost on the different lengths of packets, e.g., 100 bytes VS. 1500 bytes. It means if single package/message can hold more information between source and destination, it mitigates network delay and improve transmission efficiency for group request and response message.

The invention defines new OFPT_MULTIPART_ONE_REQUEST and OFPT_MULTIPART_ONE_RE-

For OFPT_MULTIPART_ONE_REQUEST, fill in headers and request into ofp_multipart_one_request structure defined above:
  header is instance of ofp_header which set request as OFPT_MULTIPART_ONE_REQUEST;
  index, section index, start from 0;
  has_more, if there is more than one section in current request, set it as non-zero else set it as zero;
  length[MAX_REQUEST_COMMANDS], in general, it defines MAX_REQUEST_COMMANDS (current it is 15) request command in one section. On the array, the value should be consecutive and the default value is zero. If there is actual appended command, the corresponding member of array should be set with the length of that request. Here the array member is defined at uint8_t which ranges from 0 to 255. It is long enough for most of requests. It also can be extended to larger range if it is needed;

pad is for 64 bit padding purpose here;

body is the real content of each request;

if has_more is non-zero, repeat above construction or parsing principle to construct/parse message.

The controller can merge bulk requests into one message with above structures.

The default limitation for this request is MTU (1500 by default), if the total length of request goes beyond MTU, a separate OFPT_MULTIPART_ONE_REQUEST is needed.

When switch receives OFPT_MULTIPART_ONE_REQUEST message, it parses the message with reversed logic. The default behavior of switch is to assemble all response into OFPT_MULTIPART_ONE_REPLY with below structure and logic. But switch also can send normal reply, corresponding to each request, separately.

For OFPT_MULTIPART_ONE_REPLY, fill in headers and response into ofp_multipart_one_response structure defined above:

header is instance of ofp_header which set response as OFPT_MULTIPART_ONE_REPLY;

index, section index, start from 0;

has_more, if there is more than one section in current response, set it as non-zero else set it as zero;

length[MAX_REQUEST_COMMANDS], in general, it defines MAX_REQUEST_COMMANDS (current it is 15) response command in one section. On the array, the value should be consecutive and the default value is zero. If there is actual appended command, the corresponding member of array should be set with the length of that response. Here the array member is defined at uint8_t which ranges from 0 to 255. It is long enough for most of response. It also can be extended to larger range if it is needed;

pad is for 64 bit padding purpose here;

body is the real content of each response;

If has_more is non-zero, repeat above construction or parsing principle to construct/parse message.

As mentioned above, switch either sends OFPT_MULTIPART_ONE_REPLY message or separate response message as before.

The default limitation for OFPT_MULTIPART_ONE_REPLY is MTU (1500 by default), if the total length of response goes beyond MTU, a separate OFPT_MULTIPART_ONE_REPLY is needed.

But if the request or response parsed from message is not valid, switch or controller reports corresponding error message. It is also open for switch or controller how to fix the error, terminate the request/response or retry it again.

For the response part, if the length of total reply exceeds MTU, it should send separate reply message back. It means one request may trigger multiple reply messages. The receiver should consider this case and take action accordingly.

Figure 2:
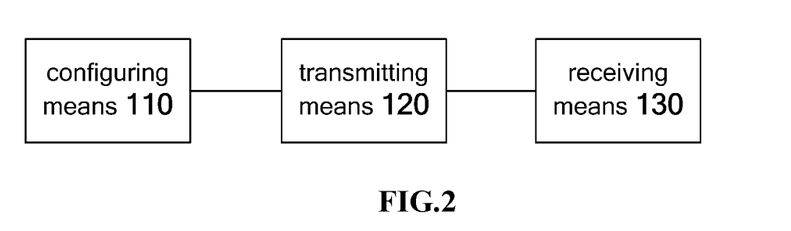
FIG. 2 shows a structural block diagram of one implementation according to a file based or single message based bulk operation processing device provided by the invention.

According to another aspect of the invention, there is provided a file based or single message based bulk operation processing device, as shown by FIG. 2, the device comprising:

a configuring means 110 arranged to construct a configuration file including at least header information and a content part, the header information including at least a section index, the section index including at least length information of each command to be sent, the content part including a plain file formed by organizing corresponding commands to be sent in an order of the section index;

a transmitting means 120 arranged to send, to a receiving terminal, bulk requests including information related to the configuration file;

a receiving means 130 arranged to receive a response from the receiving terminal; and the transmitting means 120 is further arranged to transmit the configuration file based on the response from the receiving terminal.

According to one implementation, the configuration file further includes a field indicating whether the section index can hold length information of all commands, and the configuring means 110 is further arranged to add, if the section index cannot hold length information of all commands, a section index so as to hold length information of all commands.

According to one implementation, the bulk requests are merged into one or more request messages and/or bulk responses are merged into one or more response messages.

According to one implementation, the request message and/or the response message is added if length of the merged request message and/or the merged response message exceeds a predefined length.

According to one implementation, the bulk requests include a format of the configuration file to be sent, and the response includes a determination of whether the receiving terminal supports the format of the configuration file.

According to one implementation, if the receiving terminal supports the format of the configuration file, it sends, to the device, an ACCEPT message indicating that the format of the configuration file is acceptable. The ACCEPT message may include file digest information. Upon reception of the ACCEPT message, the device may transmit the configuration file to the receiving terminal in this format, and identify, by using the file digest information, the bulk requests being transmitted.

According to one implementation, in case the receiving terminal does not support the format of the configuration file, the response further includes a file format preferred by the receiving terminal, and the transmitting means 120 is further arranged to negotiate with the receiving terminal about a format for transmitting the configuration file. Specifically, if the device supports the format preferred by the receiving terminal, it converts the format of the configuration file into the preferred format and transmits the converted configuration file to the receiving terminal; if the device does not support the format preferred by the receiving terminal, it sends a new file format to the receiving terminal for further negotiation with the receiving terminal.

According to one implementation, in case that an error occurs during transmission, the receiving terminal may send an error status message to the device to terminate the current transmission process, and optionally it may send, to the device, an error related to request for processing by the device; if no error occurs during transmission, the receiving terminal may send a DONE status message to the device when the transmission is completed.

According to one implementation, the device may be a controller or a switch.

It is appreciated that, although the aforementioned specific embodiments of the invention are provided for SDN network, these embodiments can also be applied to other proper networks, and they are not only limited to SDN network. Although the file based or single message based bulk operation processing method in the examples provided in the invention is executed by a controller, it may also be executed by other devices having control and processing functions, such as, switch, processor, CPU and etc., and the devices are not only limited to a controller.

At least one of the configuring means 110, transmitting means 120 and receiving means 130 in the device according to the invention may include program instructions that, when being executed, cause these means to operate according to exemplary embodiments described above. Any one of the configuring means 110, transmitting means 120 and receiving means 130 above can be integrated together or be executed in separate components, and can be any type adapted to local technical environment. As non-limiting embodiments, they may include one or more of a general-purpose computer, a special-purpose computer, a micropro-cessor, a digital signal processor, and a processor based on a multi-core processor architecture. The aforesaid ROM can be any type adapted to local technical environment, and can be executed by using any appropriate data storage technology, such as, semiconductor-based storage device, flash memory, magnetic storage device and system, optical storage device and system, fixed memory and removable storage.

In brief, different exemplary embodiments can be implemented in hardware or dedicated circuit, software, logic or any combination thereof, for example, some aspects can be implemented in hardware, and other aspects may be implemented in firmware or software executed by a controller, a microprocessor or other computing devices, and the invention is not limited thereto. Although different aspects of the exemplary embodiments of the invention can be illustrated and described by means of a block diagram, a flowchart, or some other manners represented by graphics, those skilled in the art may appreciate that, the blocks, components, systems, technologies or methods described herein may be implemented, as non-limiting embodiments, in hardware, software, firmware, dedicated circuit or logic, general-purpose hardware or controller or other computing device, or some combinations thereof.

It is appreciated that at least some aspects of the exemplary embodiments of the invention can be embodied as computer executable instructions, for example, in one or more program modules executed via one or more computers or other devices. Generally speaking, when being executed by a processor in a computer or any other device, a program module comprises routines, programs, objects, components, data structures and the like for performing a specific task or implementing a particular type of synopsis data. Computer executable instructions may be stored in a computer-readable medium, such as, hard disk, optical disk, removable storage medium, solid storage, Random Access Memory (RAM) and etc. Those skilled in the art will recognize that functions of the program module are incorporated or dispersed as desired in different embodiments. Furthermore, the functions can be totally or partially implemented in firmware or hardware such as integrated circuit, Field Programmable Gate Array (FPGA) and etc.

Although specific embodiments of the invention have been disclosed, those skilled in the art will appreciate that variations may be made to the specific embodiments without departing from the spirit and scope of the invention. The scope of the invention is not limited to these specific embodiments, and all such applications, variations and embodiments are covered by the accompany claims.

The invention claimed is:

1. A file based or single message based bulk operation processing method performed by a processor, the method comprising:
constructing a configuration file including at least header information and a content part, the header information including at least a section index, the section index including at least length information of each command to be sent, the content part including a plain file formed by organizing corresponding commands to be sent in an order of the section index;
sending, to a receiving terminal, bulk requests including information related to the configuration file;
receiving a response from the receiving terminal; and
transmitting the configuration file based on the response from the receiving terminal;
wherein the configuration file further includes a field indicating whether the section index can hold length information of all commands, and adding a section index so as to hold length information of all commands if the section index cannot hold length information of all commands.

2. The method according to claim 1, wherein the bulk requests are merged into one or more request messages and/or bulk responses are merged into one or more response messages.

3. The method according to claim 2, wherein the request message and/or the response message is added if length of the merged request message and/or the merged response message exceeds a predefined length.

4. The method according to claim 1, wherein the bulk requests include a format of the configuration file to be sent, and the response includes a determination of whether the receiving terminal supports the format of the configuration file.

5. The method according to claim 1, wherein if the receiving terminal does not support the format of the configuration file, the response further includes a file format preferred by the receiving terminal, and the method further comprises: further negotiating with the receiving terminal about a format for transmitting the configuration file.

6. A file based or single message based bulk operation processing device, comprising:
a configuring means arranged to construct a configuration file including at least header information and a content part, the header information including at least a section index, the section index including at least length information of each command to be sent, the content part including a plain file formed by organizing corresponding commands to be sent in an order of the section index;
a transmitting means arranged to send, to a receiving terminal, bulk requests including information related to the configuration file;
a receiving means arranged to receive a response from the receiving terminal; and
the transmitting means is further arranged to transmit the configuration file based on the response from the receiving terminal,
wherein the configuration file further includes a field indicating whether the section index can hold length information of all commands, and adding a section index so as to hold length information of all commands if the section index cannot hold length information of all commands.

7. The device according to claim 6, wherein the bulk requests are merged into one or more request messages and/or bulk responses are merged into one or more response messages.

8. The device according to claim 7, wherein the request message and/or the response message is added if length of the merged request message and/or the merged response message exceeds a predefined length.

9. The device according to claim 6, wherein the bulk requests include a format of the configuration file to be sent, and the response includes a determination of whether the receiving terminal supports the format of the configuration file.

10. The device according claim 6, wherein if the receiving terminal does not support the format of the configuration file, the response further includes a file format preferred by the receiving terminal, and the transmitting means is further arranged to further negotiate with the receiving terminal about a format for transmitting the configuration file.

11. The device according to claim 6, wherein the device is a controller or a switch.

\* \* \* \* \*